(12) United States Patent
Ota

(10) Patent No.: US 6,258,267 B1
(45) Date of Patent: Jul. 10, 2001

(54) ROTARY DRUM FILTRATION APPARATUS WITH A DETACHABLE FILTER

(75) Inventor: Seizo Ota, Ichihara (JP)

(73) Assignee: Kabushiki Kaisha Syst, Chiba-ken (JP)

( * ) Notice: Subject to any disclaimer, the term of this patent is extended or adjusted under 35 U.S.C. 154(b) by 0 days.

(21) Appl. No.: 09/583,073

(22) Filed: Feb. 12, 1999

Related U.S. Application Data

(63) Continuation of application No. 08/935,251, filed on Sep. 22, 1997, now Pat. No. 5,871,643.

(30) Foreign Application Priority Data

Oct. 14, 1996 (JP) ..................................................... 8-270880

(51) Int. Cl.$^7$ .......................... B01D 33/06; B01D 33/056
(52) U.S. Cl. ...................... 210/238; 210/168; 210/232; 210/402; 210/497.1; 210/497.01; 210/499; 29/896.62
(58) Field of Search .................................... 210/168, 238, 210/232, 40.2, 497.1, 497.01, 499; 29/896.62

(56) References Cited

U.S. PATENT DOCUMENTS

| | | |
|---|---|---|
| 346,059 | 7/1886 | Murphy . |
| 2,534,161 | 12/1950 | Collins . |
| 2,821,305 | 1/1958 | Anderson . |
| 2,987,191 | 6/1961 | Wennberg . |
| 3,036,354 | 5/1962 | Bie . |
| 3,288,296 | 11/1966 | Hirs . |
| 3,363,773 | 1/1968 | Gloss, II . |
| 3,962,091 | 6/1976 | Doria et al. . |
| 4,308,143 | 12/1981 | Harkins, Jr. et al. . |
| 4,758,341 | 7/1988 | Banner . |
| 5,039,412 | 8/1991 | Marsh . |
| 5,167,839 | 12/1992 | Widmer, II et al. . |
| 5,409,606 | 4/1995 | Spencer . |
| 5,603,846 | 2/1997 | Uchiyama et al. . |
| 5,704,887 | 1/1998 | Slowik et al. . |
| 5,871,643 | * 2/1999 | Ota ........................................ 210/238 |

FOREIGN PATENT DOCUMENTS

| | | |
|---|---|---|
| 2-45112 | 3/1990 | (JP) . |
| 8-215512 | 8/1996 | (JP) . |
| 9-075622 | 3/1997 | (JP) . |

* cited by examiner

Primary Examiner—David A. Reifsnyder
(74) Attorney, Agent, or Firm—Merchant & Gould P.C.

(57) ABSTRACT

In order to greatly shorten the filter exchange time required for detachably winding a filter (20) on the opening portions (2) formed in the outer circumferential surface of a filtration drum (1), projecting or recessed annular mounting portions (6) are respectively formed near edge portions of the outer circumferential surface of the filtration drum, to have portions (7) which prevent the wound filter from moving toward the center in the thrust direction of a main shaft (4) of the filtration drum and which maintain the filter liquid-tight, and the filter (20) is firmly fixed with fastening means (22).

6 Claims, 5 Drawing Sheets

ROTARY DRUM FILTRATION APPARATUS WITH A DETACHABLE FILTER

This application is a Continuation of application Ser. No. 08/935,251 filed Sep. 22, 1997, now U.S. Pat. No. 5,871,643, issued on Feb. 16, 1999, which is incorporated herein by reference.

BACKGROUND OF THE INVENTION

The present invention relates to a filtering apparatus and, more particularly, to a filtering apparatus in which a filter, which is wound on a filtration drum rotatably driven in order to filter and separate a liquid and solids mixedly contained in soil water after the water is used in, e.g., various types of industrial machines so that the liquid or solids can be recycled, is made exchangeable.

Conventionally, many filtering apparatuses are proposed that separate cutting oil, which contains chips after being used for metal machining, into chips and cutting oil, thus obtaining recyclable cutting oil (to be referred to as purified cutting oil hereinafter).

In such a filtering apparatus, a filter is detachably wound on opening portions formed in the outer circumferential surface of a filtration drum which is rotatably driven. The filter is exchanged when a predetermined period of operation time lapses or it is broken.

Description will be made with reference to the accompanying drawings. FIG. 5 is an outer appearance perspective view showing how to exchange a filter.

Referring to FIG. 5, a plurality of opening portions 202 are formed in the outer circumferential surface of a filtration drum 201 which is supported to rotate about a main shaft 204. Stud bolts 205 are welded at a constant interval on the filtration drum 201 in the radial direction in order to wind and fix a filter 220 on the opening portions 202.

Mounting hole portions 220c are formed in the filter 220 at portions where the stud bolts 205 on the filtration drum 201 sides are inserted, and the filter 220 has a filter portion 220b having a predetermined mesh size. In order to wind and fix the filter 220 having the above arrangement on the filtration drum 201, the mounting hole portions 220c are respectively fitted on the stud bolts 205, and the entire filter 220 is wound on the filtration drum 201. Thereafter, metal fixtures 221 which are bent in advance to match the arc of the outer circumference of the filtration drum 201 are placed on the filtration drum 201 such that their through hole portions 221b formed at a pitch corresponding to the pitch of the stud bolts 205 are set as shown in FIG. 5. Finally, nuts 31 are threadably engaged and fixed on the stud bolts 205.

In the above manner, the filter 220 is fixed near the edge portions of the outer circumferential surface of the filtration drum 201. As a result, the filter wound on the filtration drum 201 is prevented from moving toward the center in the thrust direction of the rotating shaft of filtration drum 201, and the filter 220 is held in liquid-tightness.

As described above, fixing of the filter 220 requires at least four different works:

(a) To fit the mounting hole portions 220c on all of the respective stud bolts 205;
(b) To wind the entire portion of the filter 220;
(c) To set the large number of metal fixtures 221; and
(d) To threadably engage and fix the nuts 31 with the respective stud bolts 205. The total time of the filter exchange work after the filtration drum is removed from the filtering apparatus is about 30 minutes when it is done by a person skilled in the art.

If the filter exchange work requires much time in this manner, the down time of the entire portion of other machine facilities where the filtering apparatus is arranged suffers directly. Therefore, a maximum possible reduction in the filter exchange time is sought.

Since a large number of stud bolts must be arranged in the radial direction standing upright on the filtration drum, an increase in cost is inevitable. Similarly, it is not preferable to form a large number of mounting hole portions in the filter which is an expendable supply. It is difficult to bend the metal fixtures 221 into an arc that matches the arc of the outer circumference of the filtration drum. However, if the metal fixtures 221 are not bent appropriately, a gap may form on the filter mounting surface, and liquid-tightness cannot be maintained. Since the filter is mounted such that no force is generated at all in the thrust direction of the rotating shaft of the filtration drum, the filter may sometimes loosen in the thrust direction of the rotating shaft.

SUMMARY OF THE INVENTION

The present invention has been made in view of the above respects, and has as its object to provide a filtering apparatus in which the time required for exchanging the filter can be shortened greatly, a reduction in cost in the manufacture of the filter as an expendable supply and a filtration drum can be realized, liquid-tightness can be maintained by preventing formation of a gap on the filter mounting surface, and the filter can be prevented from loosening in the thrust direction of the rotating shaft.

In order to solve the above problems and to achieve the above objects, according to the present invention, there is provided a filtering apparatus constituted by detachably winding a filter, which filters soil water used in an industrial machine into solids and a liquid, on opening portions formed in an outer circumferential surface of a filtration drum which is rotatably driven, the filtering apparatus comprising annular mounting portions respectively formed near edge portions of the outer circumferential surface, to have portions which prevent the wound filter from moving toward a center in a thrust direction of a rotating shaft of the filtration drum and which maintain the filter liquid-tight, and fastening means for firmly fixing the filter on the annular mounting portions and rendering the filter detachable.

The present invention is not limited to the embodiment to be described later. It is a matter of course that various changes and modifications may be made within the scope defined by the claims.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENT

The preferred embodiment of the present invention will be described with reference to the accompanying drawings.

Figure 1:
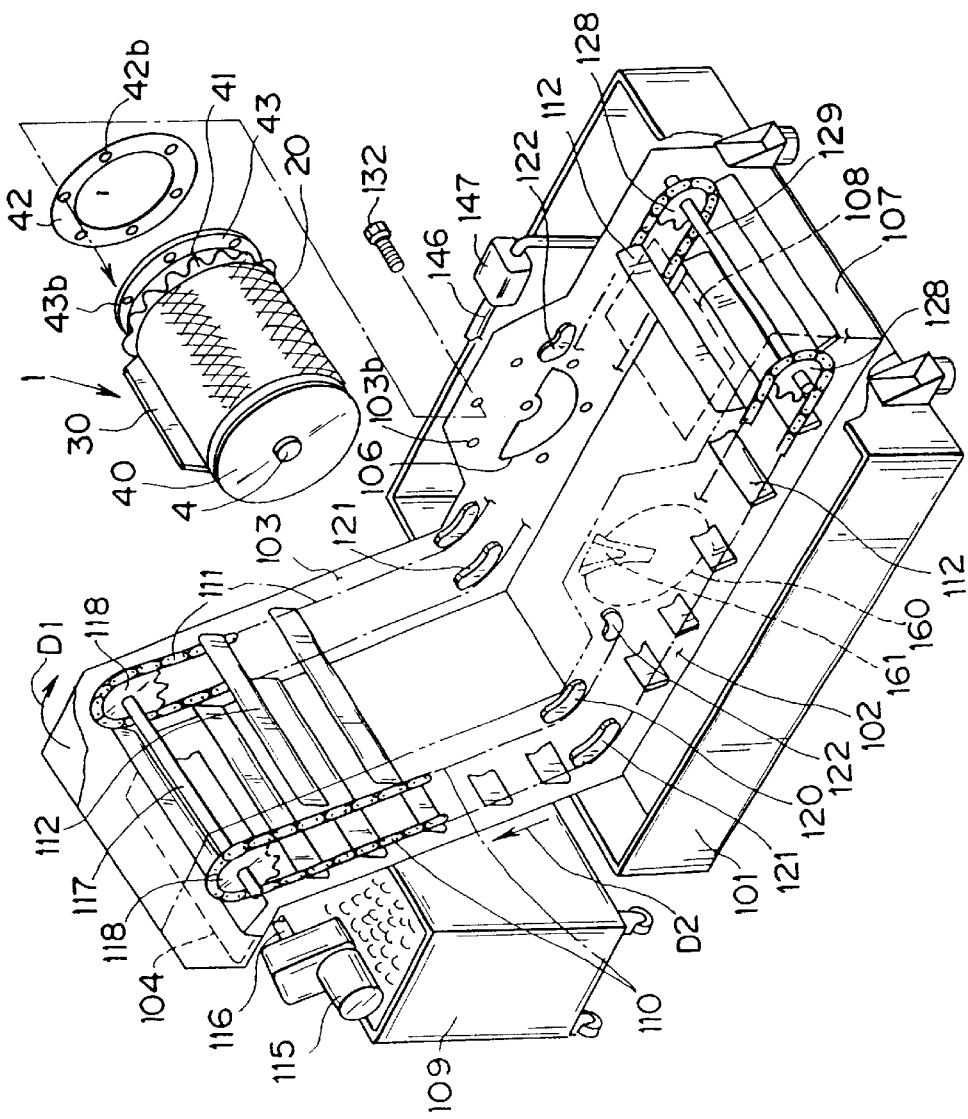
FIG. 1 is an outer appearance perspective view showing the arrangement of the main part of a filtering apparatus according to an embodiment of the present invention.

FIG. 1 is an outer appearance perspective view showing the main part of a filtering apparatus.

The filtering apparatus is used in a machine tool to filter chips from cutting oil to be filtered which mixedly contains cutting oil and chips having different particle sizes and which is generated after cutting, thereby obtaining purified cutting oil by fractionation. FIG. 1 shows the schematic arrangement of this filtering apparatus. This schematic arrangement is not limited to a machine tool but can be similarly applied to a food processing machine which separates fats and oils from a solid, and a civil engineering machine which obtains, by filtration, earth and sand according to the particle size from soil water mixedly containing earth and rocks.

Referring to FIG. 1, a plurality of clean tanks 101 for storing purified cutting oil and serving also as the base portion of the entire apparatus are continuously formed in the filtering apparatus from the side of an inlet port 108 on the upstream side indicated by a broken line to the side of a chip discharge port 104 on the downstream side indicated by a broken line.

In a storage tank 107 for temporarily storing the cutting oil to be filtered set in the contaminated state mixedly containing the chips and cutting oil (liquid agent), a filtration drum 1 for dividing the liquid level of the cutting oil to be filtered into the upstream side and downstream side is arranged at substantially the middle position between the upstream inlet port 108 and the downstream chip discharge port 104. The purified cutting oil filtered and flowing from the opening portions (to be described later) of the filtration drum 1 flows into the clean tanks 101. As shown in FIG. 1, the filtration drum 1 which is separately assembled in advance is fixed to the main body by using a plurality of bolts 132. A filter 20 having a mesh size corresponding to a desired filtering performance is exchangeably fixed on the outer circumferential surface of the filtration drum 1.

An injection pipe (not shown) also serving as a main shaft 4 of rotation is arranged in the filtration drum 1. The injection pipe cleans the filter 20 from the inner surface side (from the outflow side of the purified cutting oil) by reverse flow to prevent clogging. For the purpose of this reverse flow cleaning, the purified cutting oil stored in the clean tanks 101 is strongly injected from inside the filtration drum 1 through a pump 147, to blow off the remaining chips and the like attaching to the surface of the filter 20, thereby effectively preventing clogging of the filter 20.

Right and left endless chains 111 and 110 each indicated by a short dashed line in FIG. 1 are arranged to extend from the upstream inlet port 108 to the downstream chip discharge port 104 in order to continuously convey the chips. A large number of scoop plates 112 are formed on each of the chains 111 and 110 at predetermined intervals by using metal fixtures. Upon reception of a drive force from a geared motor 115, the right and left chains 111 and 110 move in the direction of an arrow D2 in FIG. 1 and mesh with a drum sprocket 41, fixed at a portion on the right side of the outer circumferential surface of the filtration drum 1, midway along the right and left chains 111 and 110.

As a result, the respective chains are guided by drum chain guides 122 in the manner shown in FIG. 1. The respective chains are directionally switched through 180° by sprockets 118 arranged on the upstream side of the apparatus and are directed in the direction of an arrow D1 in FIG. 1.

With the above arrangement, the chips which have settled in the cutting oil to be filtered are conveyed to the downstream side and eventually move upward along the inclined portion shown in FIG. 1 in the direction of the arrow D2 in FIG. 1, so that they are discharged to the outside through the chip discharge port 104.

As a result of the series of operations described above, purified cutting oil which is purified in accordance with the filtering ability of the filter 20 is stored in the clean tanks 101. The purified cutting oil obtained in this manner is used for precision machining and the like.

Referring to FIG. 1, the clean tanks 101 serving as the base portion of the entire apparatus are divided into right and left sides, and leg portions for installation are fixed at the four corners of the clean tanks 101 as a whole. Hence, the clean tanks 101 can be horizontally installed and fixed on the floor surface in a factory.

The storage tank 107 for the cutting oil to be filtered, which shares its bottom surface with the clean tanks 101 in order to store the cutting oil to be filtered, is constituted between the clean tanks 101 having the above arrangement. For this purpose, a left-hand side plate 102 and a right-hand side plate 103 (each of which is partly indicated by an alternate long and two short dashed line) are liquid-tightly fixed to the front wall surfaces and bottom surfaces of the clean tanks 101 by continuous welding so as to be contiguous to them. The respective constituent elements to be described hereinafter are mostly mounted through the right and left side plates 103 and 102 as the mounting portions.

As shown in FIG. 1, the right and left side plates 103 and 102 are arranged such that the rear side of the apparatus corresponds to the downstream side and that the front side in FIG. 1 corresponds to the upstream side. The downstream sides of the plates 102 and 103 extend obliquely upward, as shown in FIG. 1. At the uppermost portions of the plates 102 and 103, the chip discharge port 104 indicated by a broken line is formed between the plates 102 and 103. Through this port, the chips fall into a chip recovery box 109 which is moved to a portion below the chip discharge port 104.

The uppermost stream sides of the right and left side plates 103 and 102 share their side walls with the clean tanks 101. The right and left side plates 103 and 102 form the upwardly open inlet port 108 between them on the upstream side (front side of the apparatus) of the filtration drum 1 which is pivotally held as will be described later. The cutting oil to be filtered can be appropriately introduced into the cutting oil storage tank 107 through the inlet port 108.

Bearings (not shown) are disposed at the obliquely upward portions corresponding to the downstream sides of the right and left side plates 103 and 102. The plates 103 and 102 rotatably, axially support a sprocket shaft 117 on which the pair of right and left upper sprockets 118 are fixed. An output shaft 116 of the geared motor 115 fixed to the left-hand side plate 102 and integrally formed with a reduction unit is connected to the sprocket shaft 117. When the geared motor 115 drives, the output shaft 116 continuously drives the upper sprockets 118 clockwise.

Bearings (not shown) are also disposed on the front side in FIG. 1 which corresponds to the uppermost stream sides of the right and left side plates 103 and 102. These bearings rotatably, axially support a sprocket shaft 129 on which a pair of right and left lower sprockets 128 are fixed.

Between the upper sprockets 118 and lower sprockets 128 arranged in this manner, the right and left chains 111 and 110, part of each of which is indicated by a short dashed line in FIG. 1, are mounted to mesh with the sprockets. The chains 111 and 110 are guided substantially along the right and left side plates 103 and 102, as shown in FIG. 1. Meanwhile, on the upstream and downstream sides of the filtration drum 1, upper chain guides 120 and lower chain guides 121 are respectively fixed at direction switch portions of the chains on the opposing surfaces of the right and left side plates 103 and 102 in order to supply a rotational driving force to the filtration drum 1.

A predetermined number of scoop plates 112 fixed between the right and left chains 111 and 110 are arranged in the manner as shown in FIG. 1 to convey and discharge chips to the upstream side. While the chips in the cutting oil to be filtered are conveyed for a sufficiently long distance toward the upstream side of the chip discharge port 104, they are sufficiently removed from the cutting oil.

The drum sprocket 41 on the outer circumferential surface of the filtration drum 1 obtains a pivot force from the right chain 111 meshing it, so that it is constantly pivoted clockwise. The filter 20 formed of, e.g., a chemical fiber mesh or the like and having a filtering performance of about 50 microns is exchangeably wound and fixed on the outer circumferential surface of the filtration drum 1. The filter 20 allows the cutting oil to be filtered to pass through it, thereby filtering the cutting oil to be filtered. After purified cutting oil is obtained, it flows into the clean tanks 101 through a semicircular opening portion 106 formed in the right-hand side plate 103 of the clean tanks 101.

A floating chip scoop plate 30 is fixed on the outer circumferential surface of the filtration drum 1, to cause the floating chips, which have gained buoyancy in the cutting oil to be filtered and float on the oil surface, to settle in the cutting oil to be filtered. As the filtration drum 1 pivots clockwise, the floating chip scoop plate 30 acts to make the floating chips settle in the cutting oil to be filtered, so that the floating chips are prevented from growing large to damage the filter 20.

In the fractionation filtering apparatus described above, both the scoop plates 112 arranged between the right and left chains 111 and 110 at predetermined intervals and the filtration drum 1 can be driven upon obtaining a driving force from one motor 115 serving as a common drive source. The apparatus can therefore be made at a low cost. Since the inlet port 108 for the cutting oil to be filtered can be set at a low position, charging the oil is facilitated, and chips can be dropped from above the chip recovery box 109 having a comparatively large height through the chip discharge port 104. As a result, a rational layout can be realized Through holes 103*b* are formed near the semicircular opening portion 106 of the right-hand side plate 103 described above in order to receive bolts 132, which are to threadably engage with screw holes 43*b* formed in a right disk member 43. While the bolts 132 respectively extend through hole portions 42*b* formed in a rubber sheet 42 serving as an elastic plate member, the rubber sheet 42 can be detachably fixed on the right-hand side plate 103. A left disk member 40 is arranged on the left side of the filtration drum 1. Seal members usually called V-seals are arranged on the right and left disk members 43 and 40 to seal the side surfaces of the filtration drum 1. The seal members divide the apparatus into the upstream and downstream sides through the filtration drum 1.

To fix the semi-completed product of the filtration drum 1 described above, after the bolts 132 are set in through holes 103*a* formed near the semicircular opening portion 106 in the storage tank 107, as shown in FIG. 1, they are inserted in the hole portions 42*b* formed in the rubber sheet 42, and are threadably engaged with the screw holes 43*b* formed in the right disk member 43. The main shaft 4 supported on an upper plate (indicated by a broken line) fixed to the left-hand side plate 102 is partly exposed from the left disk member 40. Therefore, the main shaft 4 is assembled to support the left side of the filtration drum 1. Thereafter, the respective chains are set, and a cover (not shown) is fixed, thus completing the apparatus. To exchange the filtration drum 1, the filter 20 is exchanged by removing the filtration drum 1 in substantially the opposite order to that described above.

When the filtration drum 1 is arranged and fixed in the above manner, soil water can be effectively prevented from entering from the side surfaces of the filtration drum 1 which is rotatably driven in the storage tank 107. Even if the filtering apparatus is used over a long period of time, the filtering precision is not degraded, and the time required for the assembly can be shortened, thus improving the productivity. The chips which float along with elevation of the liquid level of the cutting oil to be filtered can settle in the cutting oil to be filtered because of the operation of the floating chip scoop plate 30, so the floating chips are effectively prevented from growing large to damage the filter 20.

Figure 2:
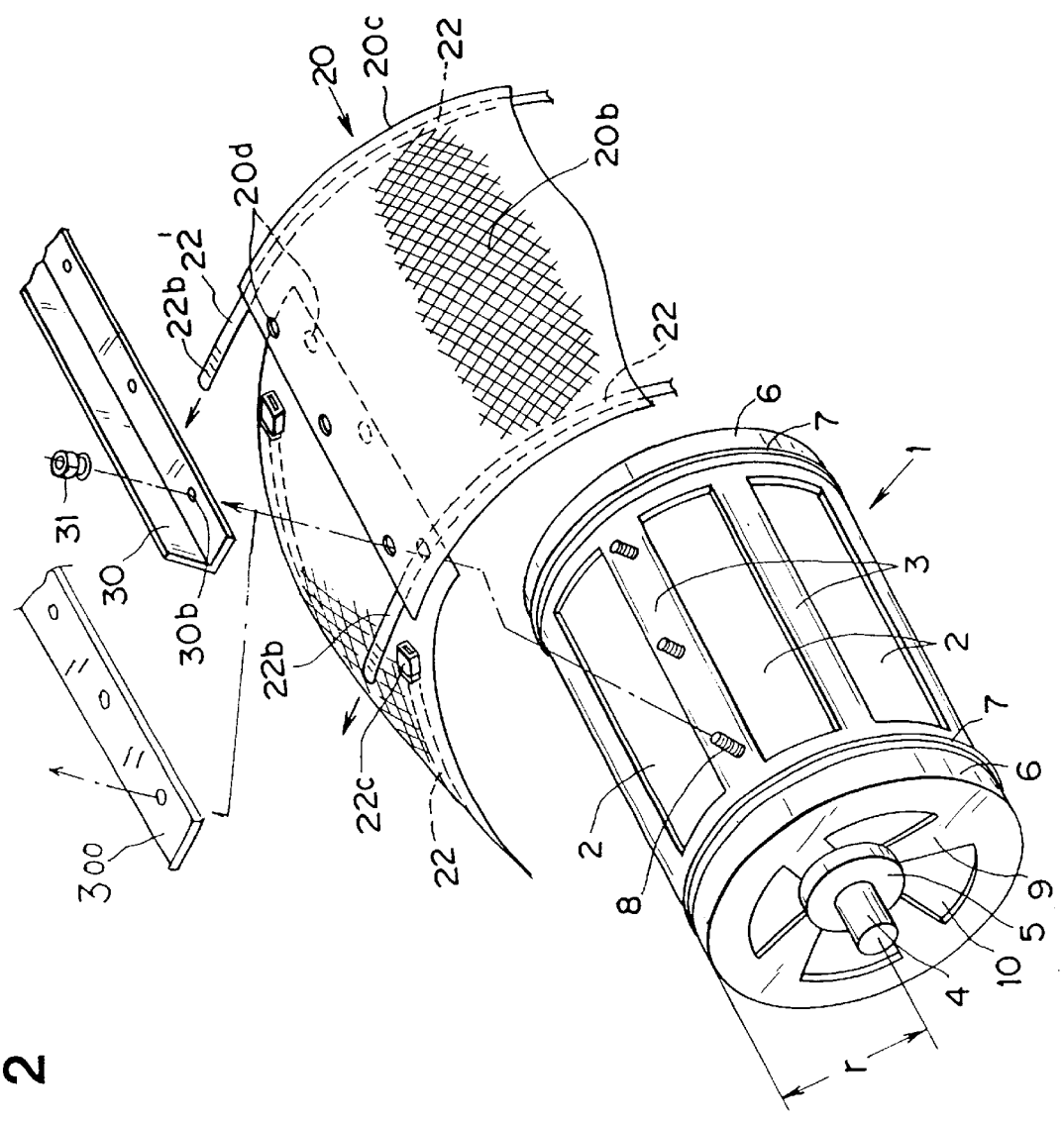
FIG. 2 is an outer appearance perspective view of a filtration drum shown together with a filter.

FIG. 2 is an outer appearance perspective view showing an example of the filtration drum 1 together with the filter 20. In FIG. 2, all of the above-described right and left disk members 43 and 40, the drum sprocket 41, and the like arranged on the filtration drum 1 are omitted.

First, regarding the arrangement of the filtration drum 1, opening portions 10 are formed among arm portions 9 such that the arm portions 9 are fixed to a pair of bearings 5. Of the bearings 5, one on the stationary side is arranged on the main shaft 4. The purified liquid flows from the semicircular opening portion 106 into the clean tanks 101 through the opening portions 10.

Annular mounting portions 7 are arranged near the two edge portions of the two sides of the outer circumferential surface of the filtration drum 1. The annular mounting portions 7 prevent the filter 20, which is wound, from moving toward the center in the thrust direction of the main shaft 4, and maintain the filter 20 liquid-tight. Flat mounting surface portions 6 each having a radius r are respectively formed on the outer sides of the annular mounting portions 7.

As shown in FIG. 2, a plurality of opening portions 2 are formed at a predetermined pitch inside the annular mounting portions 7 to extend along the rotating direction of the filtration drum 1. Hence, bridge portions 3 are respectively arranged between adjacent opening portions 2. Stud bolts 8 extend upright on one of the bridge portions 3. The stud bolts 8 extend through hole portions 20*d* formed in those portions of the filter 20 that overlap each other after the filter 20 is wound and correspond to the winding start and end portions of the filter 20, then extend through hole portions 30*b* of the floating chip scoop plate 30 described above, and are fixed with nuts 31. The winding start and end portions of the filter 20 are fixed in this manner, or by using a plate member 300 that fixes the winding start and end portions of the filter 20. Alternatively, an industrial chuck (zipper) may be arranged at the winding start and end portions of the filter 20, and the filter 20 may be fixed by it. In this case, the stud bolts and the like can be omitted.

Tubular plain stitch portions 20*c* formed by so-called tubular plain stitches are formed on the two edge portions of the filter 20. A one-touch type fastener 22 is inserted in each edge portion of the filter 20. The fasteners 22 serve as fastening means that firmly fix the filter 20 on the mounting surface portions 6 and render it detachable.

A fixing portion 22*c* is integrally formed on one end of each fastener 22, and an insertion portion 22*b* is integrally formed on the other end of each fastener 22. After the filter 20 is wound, the winding start and end portions of the filter 20 are fixed, and thereafter the insertion portions 22b are inserted in the fixing portion 22c and are pulled strongly in the direction indicated by arrows, thereby firmly fixing the two edge portions of the filter 20 on the mounting surface portions 6. Namely, the catch portions (not shown) engage with each other to prevent removal of the filter 20 in the opposite direction.

Figure 3A:
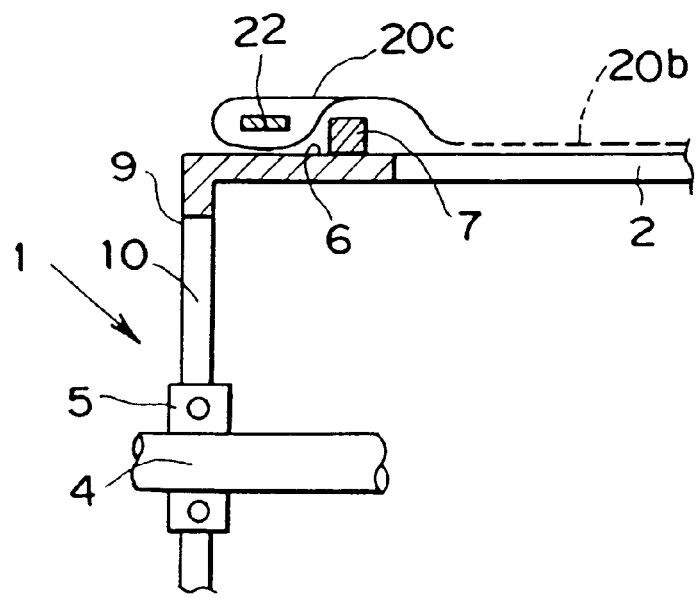
FIGS. 3A and 3B are sectional views of the main part of the apparatus after the filter is mounted.

At this time, as shown in the main part sectional view of FIG. 3A, the filter 20 partly rides on the annular mounting portions 7. Therefore, liquid-tightness can be maintained throughout the entire portion of the filter 20. Simultaneously, a pulling force is generated in the thrust direction of the main shaft 4, thereby preventing loosening of the filter 20.

Figure 3B:
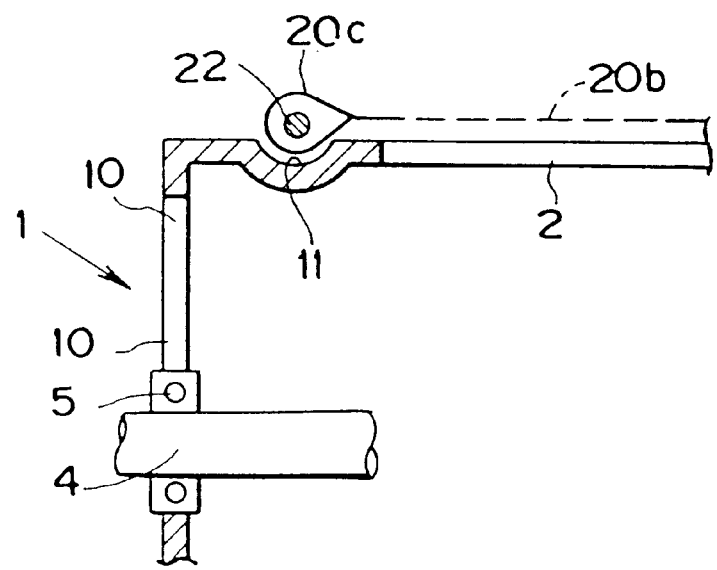

As shown in the main part sectional view of FIG. 3B, groove portions 11 where the tubular plain stitch portions 20c of the filter 20 fit may be formed in place of the annular mounting portions 7, so that liquid-tightness can be maintained as a whole, and that simultaneously a pulling force in the thrust direction of the main shaft 4 may be generated, thereby preventing loosening.

Figure 4A:
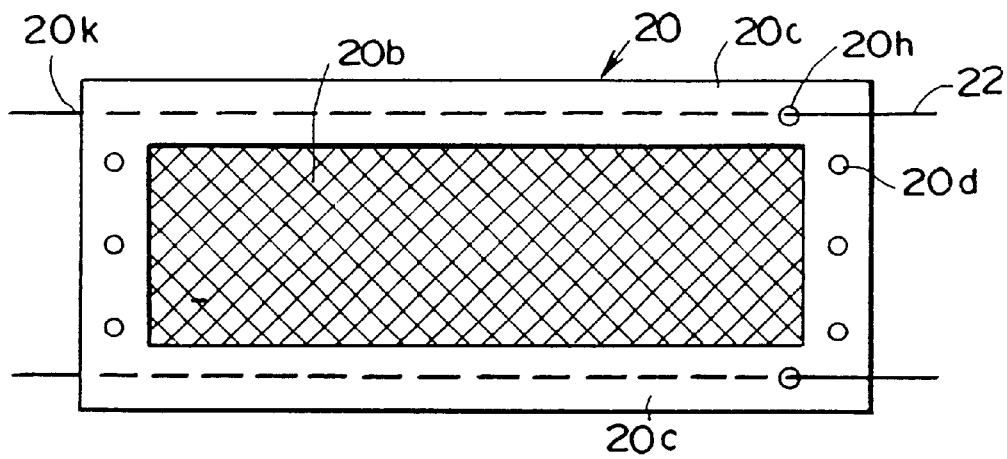
FIGS. 4A, 4B, and 4C are developments of the filter.
Figure 4B:
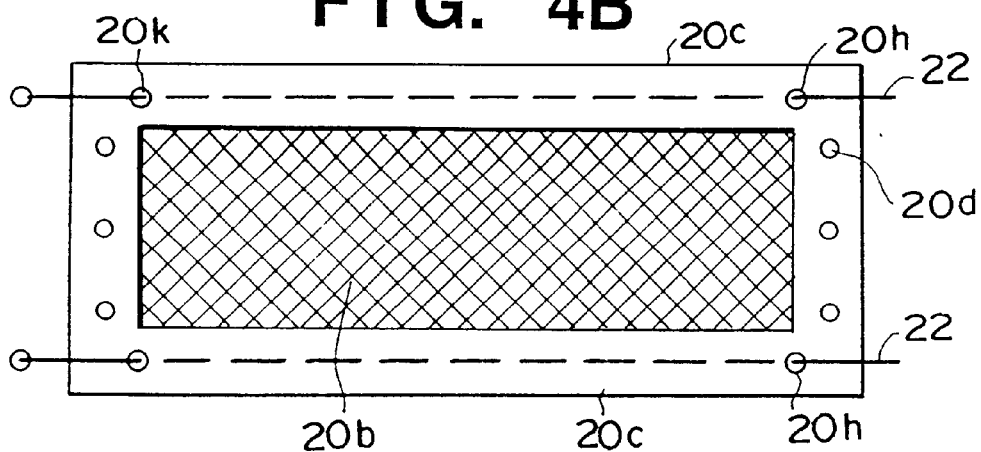
Figure 4C:
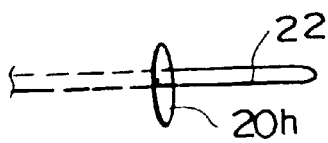
Figure 4C:
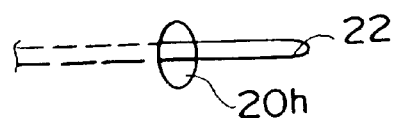
Figure 4C:
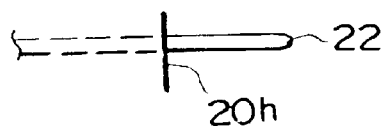
Figure 5:
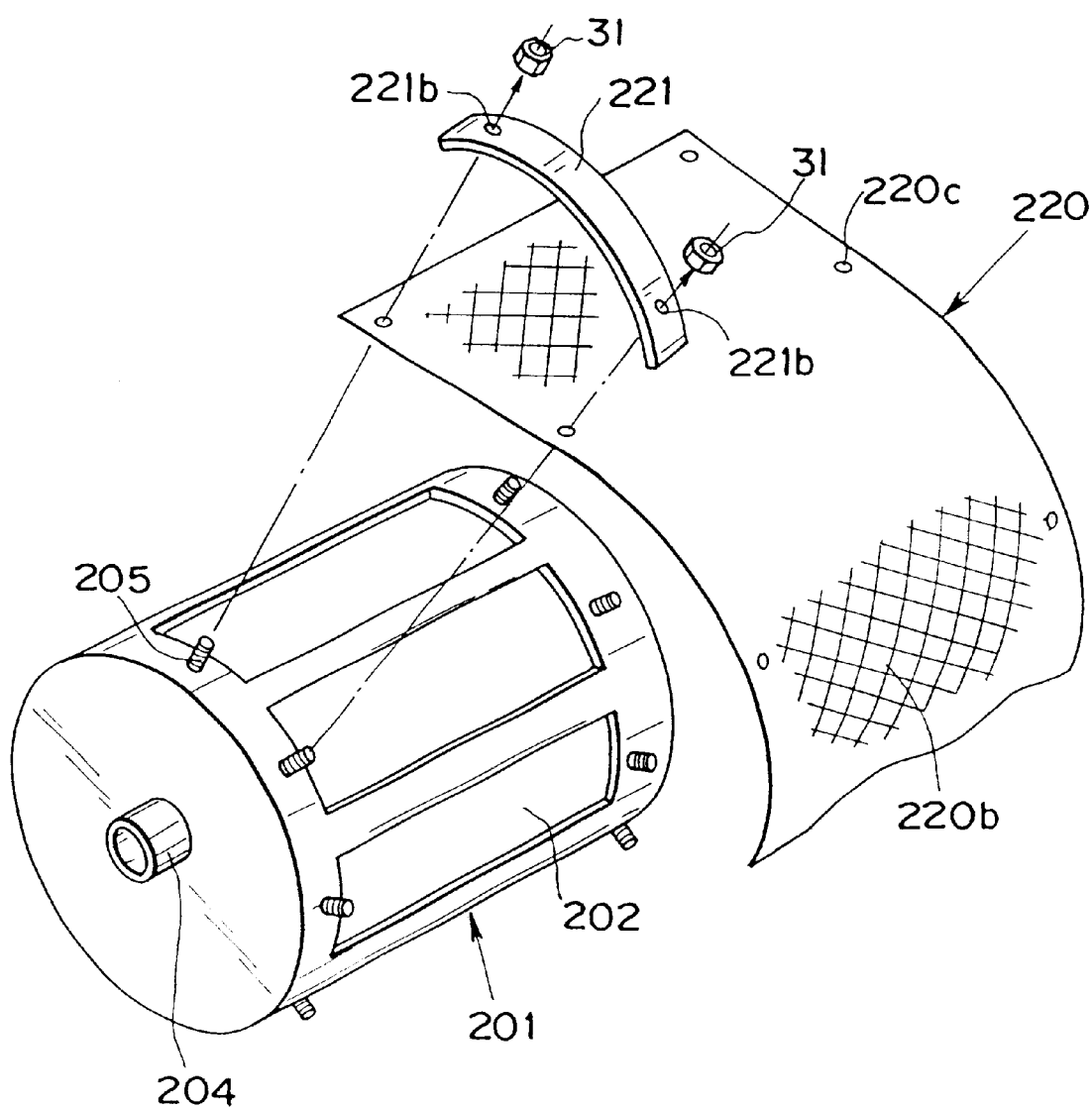
FIG. 5 is an outer appearance perspective view of a conventional filtration drum shown together with a filter.

Finally, FIGS. 4A to 4C are developments of the filter 20. Portions that are already described are denoted by the same reference numerals and a detailed description thereof will be omitted. Only portions that are not described yet will be described.

Referring to FIG. 4A, one end of each one-touch type fastener 22 inserted in the corresponding tubular plain stitch portion 20c is exposed to the outside from a hole portion 20h. The other end of each fastener 22 is exposed to the outside from a hole portion 20k at the edge portion. In place of the fasteners 22, any members, e.g., metal wires, strings, wires, vinyl ropes, or the like can be used as far as their terminal ends can be fastened and they can be removed easily. If the one-touch type fasteners 22 are used, once they are cut with a nipper, they cannot be used again. In this respect, if metal wires are employed, they can be used over and over again, which is advantageous. However, considering the time required for insertion into the tubular plain stitch portions, the one-touch type fasteners are the best.

Referring to FIG. 4B, one end of each fastener 22 inserted in the corresponding tubular plain stitch portion 20c is exposed to the outside from the hole portion 20h, and the other end of each fastener 22 to the outside from the hole portion 20k.

Concerning the shape of the hole portion 20h, an elliptic one, a semi-circular one, a mere cut-out one, and the like, as shown in FIG. 4C, are available.

With the filter 20 having the above arrangement, the total time of the filter exchange work after the filtration drum was removed from the filtering apparatus was about 5 minutes when it was done by a person skilled in the art. Since the number of stud bolts of the filtration drum 1 could be reduced, a great cost reduction could be achieved. Since loosening of the filter in the thrust direction of the rotating shaft, as in the conventional case, could be prevented, the initial filtering performance could be maintained.

As has been described above, according to the present invention, there is provided a filtering apparatus in which the time required for exchanging the filter wound on the outer circumferential surface of the filtration drum can be shortened greatly, a large reduction in cost in the manufacture of the filter as an expendable supply and a filtration drum can be realized, complete liquid-tightness can be maintained by preventing formation of a gap on the filter mounting surface after the filter is mounted, and the filter can be prevented from loosening in the thrust direction of the rotating shaft, thereby maintaining the prescribed filtering performance.

The filtration drum can also be used as a cleaning machine that reutilizes an alkali cleaning liquid used for cleaning components formed by machining.

As many apparently widely different embodiments of the present invention can be made without departing from the spirit and scope thereof, it is to be understood that the invention is not limited to the specific embodiments thereof except as defined in the appended claims.

What is claimed is:

1. A filtering apparatus to be used together with industrial machines comprising machine tools for cutting or grinding or cleaning machines, said filtering apparatus being comprised of:

a filtration drum which is rotatably driven, and a filter detachably wound thereon, for filtering soiled liquid used in said industrial machines into solids and a liquid, the filter being wound over a plurality of opening portions formed in an outer circumferential surface of the filtration drum, said filter having stitch portions provided on edge portions, said stitch portions having hole portions;

annular mounting portions respectively formed near edge portions of said outer circumferential surface of said filtration drum, having portions which prevent the wound filter from moving toward a center in a direction of a rotatably driving main shaft of said filtration drum, said portions maintaining the filter liquid-tight;

fasteners for firmly fixing said filter on said annular mounting portions and rendering said filter detachable, said fasteners having terminal ends for fastening together and unfastening, said fasteners fitting within said stitch portions such that said terminal ends can be drawn through said hole portions; and bridge portions arranged between adjacent ones of said plurality of opening portions so that the opening portions are arranged at a predetermined pitch along a rotating direction of said filtration drum, and wherein said hole portions of said stitch portions being positioned such that winding start and end portions of said filter are firmly and detachably fixed on one of said bridge portions and said terminal ends of said fasteners can be drawn through said hole portions and fastened together and unfastened.

2. The apparatus according to claim 1, wherein said winding start and end portions are fixed on one of said bridge portions with a plate member having settling means for making solids floating on a surface of the soil liquid settle in the soil liquid.

3. The apparatus according to claim 1, wherein said solids are chips or grinding chips.

4. The apparatus according to claim 1, wherein said liquid is one from the group consisting of cutting work liquid, grinding work liquid, and cleaning liquid for component cleaning.

5. The apparatus according to claim 1, wherein said fasteners comprise strings movably incorporated in tubular portions forming said stitch portions respectively formed on edge portions of said filter in the rotating direction of the filtration drum.

6. The apparatus according to claim 5, wherein said strings each have one end integrally formed with a first locking portion and another end integrally formed with a second locking portion to be locked by said first locking portion.

* * * * *